United States Patent [19]

Watkins et al.

[11] Patent Number: 5,203,209

[45] Date of Patent: Apr. 20, 1993

[54] MOTION MEASUREMENT OF ACOUSTICALLY LEVITATED OBJECT

[75] Inventors: John L. Watkins, Pasadena; Martin B. Barmatz, Glendale, both of Calif.

[73] Assignee: The United States of America as represented by the Administrator of the National Aeronautics and Space Administration, Washington, D.C.

[21] Appl. No.: 660,380

[22] Filed: Feb. 25, 1991

[51] Int. Cl.$^5$ ............................................. G01P 13/04
[52] U.S. Cl. .................................................... 73/505
[58] Field of Search ................. 73/579, 571, 586, 505; 181/0.5

[56] References Cited

U.S. PATENT DOCUMENTS

| | | | |
|---|---|---|---|
| 2,999,389 | 9/1961 | Granquist . | |
| 3,164,022 | 1/1965 | Ensley | 73/516 |
| 3,905,235 | 9/1975 | Shaw | 73/505 |
| 4,420,977 | 12/1983 | Elleman et al. | 73/505 |
| 4,573,356 | 3/1986 | Barmatz et al. | 73/505 |
| 4,672,848 | 6/1987 | Gohin et al. | 73/505 |
| 4,689,993 | 9/1987 | Slettemoen | 73/579 |
| 4,716,764 | 1/1988 | Felix | 73/579 |
| 4,773,266 | 9/1988 | Barmatz et al. | 73/505 |
| 4,777,823 | 10/1988 | Barmatz et al. | 73/505 |
| 4,800,756 | 1/1989 | Barmatz et al. | 73/505 |
| 4,903,531 | 2/1990 | LeBlond et al. | 73/505 |
| 4,964,303 | 10/1990 | Barmatz et al. | 73/505 |

OTHER PUBLICATIONS

Journal of Acoustic Soc. Am. Aug. '82, "Resonance frequency shift .. " by Leung, Lee, Jacobi, and Wang.

*Primary Examiner*—Hezron E. Williams
*Assistant Examiner*—Rose M. Finley
*Attorney, Agent, or Firm*—John H. Kusmiss; Thomas H. Jones; Guy M. Miller

[57] ABSTRACT

A system is described for determining motion of an object that is acoustically positioned in a standing wave field in a chamber. Sonic energy in the chamber is sensed, and variation in the amplitude of the sonic energy is detected, which is caused by linear motion, rotational motion, or drop shape oscillation of the object. Apparatus for detecting object motion can include a microphone (24) coupled to the chamber and a low pass filter (40) connected to the output of the microphone, which passes only frequencies below the frequency of sound produced by a transducer (18) that maintains the acoustic standing wave field. Knowledge about object motion can be useful by itself, can be useful to determine surface tension, viscosity, and other information about the object, and can be useful to determine the pressure and other characteristics of the acoustic field.

3 Claims, 1 Drawing Sheet 5,203,209

MOTION MEASUREMENT OF ACOUSTICALLY LEVITATED OBJECT

ORIGIN OF THE INVENTION

The invention described herein was made in the performance of work under a NASA contract and is subject to the provisions of Public Law 96-517 (35 USC 202) in which the Contractor has elected not to retain title.

BACKGROUND OF THE INVENTION

The use of acoustic energy to levitate or position an object within a chamber has many uses, especially in satellites to hold objects under almost zero gravity without touching them with a solid support (containerless processing). In acoustic positioning, one or more transducers apply sonic energy to the chamber at one or more frequencies that are resonant to the chamber and that force the object towards a stable equilibrium position lying away from the walls of the chamber. A positioned object often undergoes translational motion, rotational motion, and/or drop shape oscillation (oscillation in shape) which may be accidental or which may be purposely caused. U.S. Pat. No. 4,773,266 by Barmatz et al describes techniques for inducing or damping motion and describes several useful types of information that can be gleaned from knowledge about motion of an acoustically positioned object. However, measurement of object motion can be difficult.

Where the object is positioned at room temperature in a chamber with transparent walls, object motion can be observed directly or detected by light beams directed across the path of the object onto photo cells. However, in many cases such as where the object is processed at high temperatures, it is very difficult to directly observe the object or measure its motion by light beams. A simple technique which allowed measurement of object motion in translation, rotation, and/or drop oscillation motion, would have many uses.

SUMMARY OF THE INVENTION

In accordance with one embodiment of the present invention, a method and apparatus are provided for sensing motion of an acoustically positioned object. The object is positioned by an acoustic standing wave field in the chamber, which is established by at least one transducer that produces sonic energy of a frequency resonant to the chamber. At least one microphone or other acoustic sensor is positioned to sense acoustic energy in the chamber, which is of the frequency of the transducer output but which is amplitude modulated by motion of the object. Amplitude variations in the resonant acoustic energy is used to determine object motion. The apparatus can include one or more low pass or band filters connected to the output of a microphone that is coupled to the chamber, with the filter passing only frequencies below the resonant frequency output of the transducer which produces the acoustic standing wave field.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
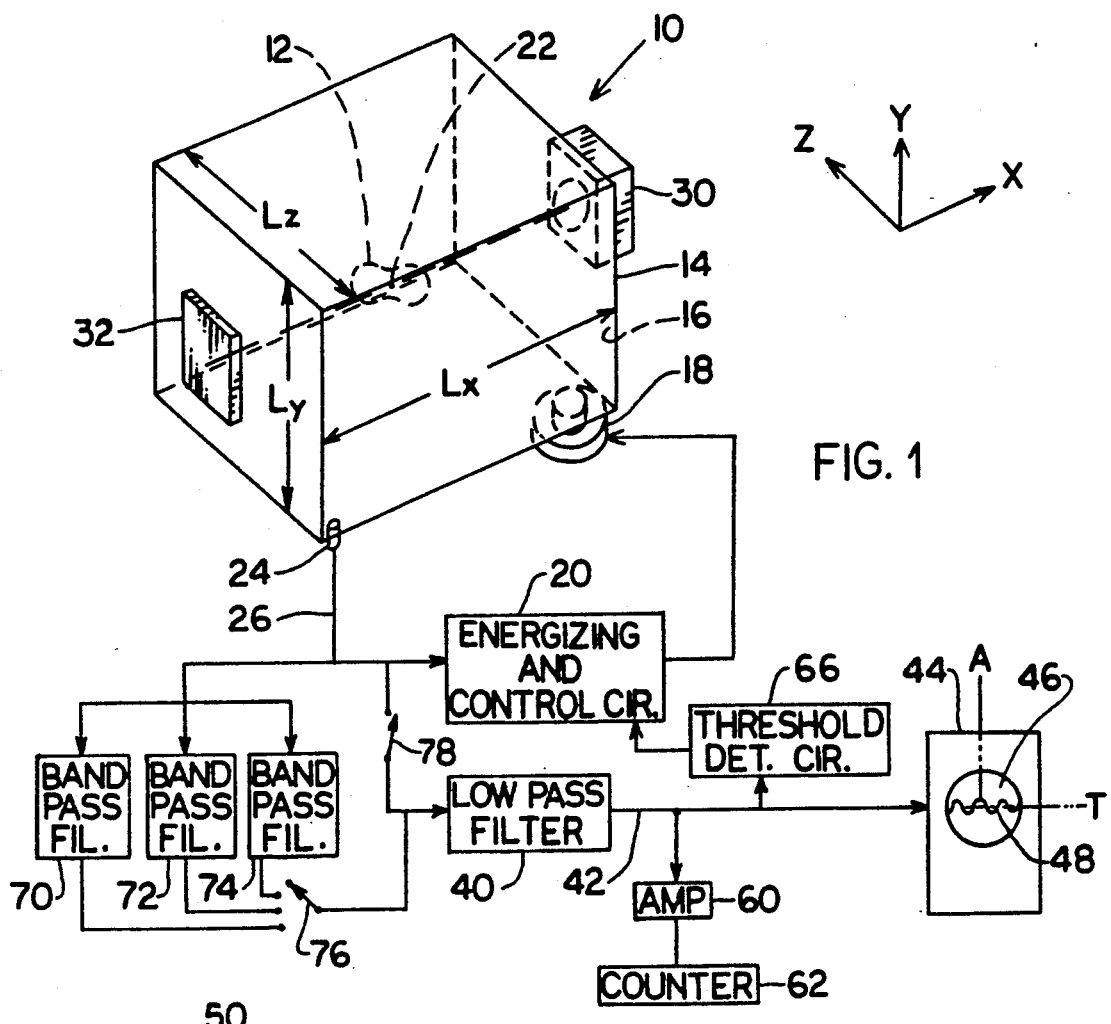
FIG. 1 is an isometric and block diagram of apparatus for detecting motion of an object that is acoustically positioned in a chamber.

FIG. 1 illustrates a system 10 for acoustically positioning an object 12. The system includes walls 14 forming a chamber 16 filled with a gas such as air or nitrogen, and an acoustic transducer 18 whose sonic energy is applied to the inside of the chamber. The chamber lies in a microgravity environment. An energizing and control circuit 20 is connected to the transducer 18 to drive it at a frequency which is resonant to the chamber. A frequency is chosen which establishes an acoustic standing wave field in the chamber, that has a pressure node at position 22 to which nearby objects are urged. In a near zero gravity environment where only acoustic forces are applied to the object, such as may exist on space vehicles, the object 12 may lie at the node position. In a one-G environment, the object would be levitated below the node position due to the additional force of gravity. A microphone 24 senses acoustic energy in the chamber, and generates an electrical signal on line 26, that is delivered to the control circuit 20. The control circuit 20 varies the frequency of its output slightly, to maintain a frequency at which the output of the microphone 26 is near maximum (for a given control circuit power output), so as to continue to drive the transducer 18 at a frequency very close to a desired resonant frequency. This type of acoustic positioning system is described in the prior art, such as in U.S. Pat. No. 4,573,356 by Barmatz et al.

Where the sample is at room temperature so the chamber walls can be made of transparent material such as of transparent plastic, motion of the object can be directly observed. Also, motion of the object can be automatically detected by a light source 30 which directs light across the object onto an array of photo cells 32. The object may undergo translational motion, wherein it moves toward or away from the node position 22, along any direction such as one of the three orthogonal directions X, Y, and Z or at an angle to them, or the object may rotate about any axis. Also, any liquid (molten) object may undergo drop oscillations, wherein it oscillates in shape.

In many processing applications, such as where the object has to be heated to a high temperature, the walls of the chamber may be opaque so no light beam can pass through them, and it is not feasible to form an observation hole. In such a situation, it is difficult to determine motion of the object. It may be noted that the object may be a liquid under the high temperature in the chamber, or may be a solid.

In accordance with the present invention, motion of the object is determined by sensing sonic energy within the chamber, as by monitoring the output of the microphone 24 that is coupled to the chamber. FIG. 1 shows a low pass filter 40 connected to the output of the microphone. While the output of the microphone, on line 26, represents sonic energy in the chamber, the output of the low pass filter, on line 42, represents the amplitude modulation of the sonic energy in the chamber. In one example, the output of the control circuit 20 is a sinusoidal wave of a frequency of 20 kHz, which is the "positioning frequency" output of transducer 18, while the object 12 oscillates along the direction Y at a frequency of 2 Hz. The filter 40 could be constructed to pass only frequencies below 19 kHz, although where object motion is never expected to approach the positioning frequency a lower filter cutoff frequency such as 1 kHz may be used. The output of the filter 40 may be delivered to apparatus that indicates a characteristic of the amplitude modulation, such as its frequency or amplitude. FIG. 1 shows an oscilloscope 44 whose screen 46 displays a wave 48 that shows the inverse of frequency (period) along a time axis T, and amplitude along amplitude axis A.

Figure 2:
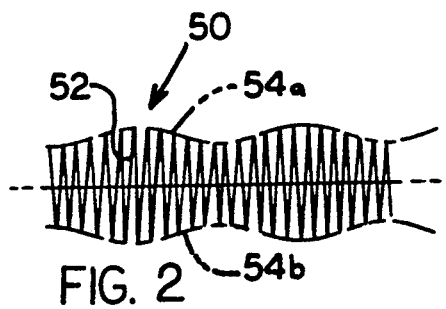
FIG. 2 includes a graph representing one possible output of the microphone of FIG. 1.
Figure 2A:
FIG. 2A includes a graph representing the amplitude modulation of the graph of FIG. 1.
Figure 3:
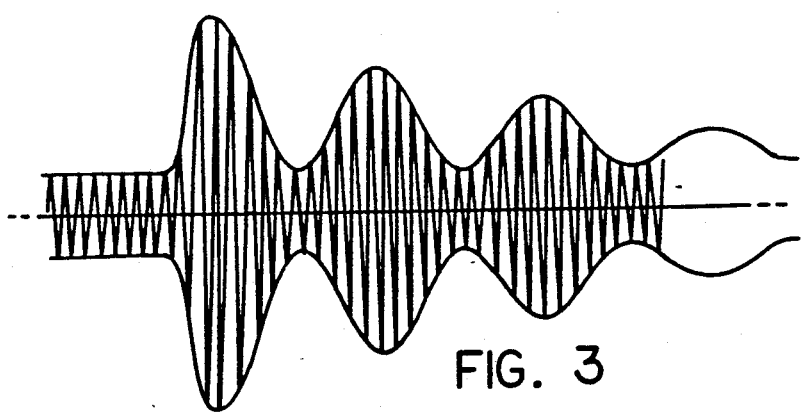
FIG. 3 includes a graph representing another possible output of the microphone of FIG. 1.

FIG. 2 is a simplified diagram of an amplitude modulated signal that can be produced by the microphone of FIG. 1. The wave form of the diagram includes a fundamental frequency indicated at 52 representing the resonant frequency output of the transducer, which may have a frequency such as 20 kHz. This frequency is amplitude modulated, as indicated by modulation lines 54a, 54b which may have a frequency such as 2 Hz. FIG. 2A shows a wave 54 which represents the low frequency amplitude modulation component of the wave 50 of FIG. 2, with the wave 54 being the output of the low pass filter 40 of FIG. 1. FIG. 3 shows another amplitude modulated wave representing a situation where the object is suddenly displaced and oscillates, but where the oscillations are damped so the amplitude modulation decreases. Other modes of modulation may be present, such as where the object moves directly away from the node position and against a wall of the chamber.

FIG. 1 illustrates another subcircuit which includes an amplifier 60 whose output is delivered to a counter 62 which registers the frequency of oscillations of the object. Such oscillations may be in translation, rotation, and/or in drop shape oscillation. An estimate of whether the amplitude modulation represents rotation or transitional oscillation of the object, usually can be determined because the approximate translational oscillation frequency can be estimated from the intensity of the acoustic standing wave field and the mass of the object. From knowledge of the surface tension and sample radius, the drop shape oscillation frequencies also can be estimated. It may be noted that only rotation of an axially nonsymmetrical object can be detected by the present invention, and rotation such as of a sphere about an axis passing through its center, will not produce an appreciable amplitude modulation.

For an object that is oscillating in translation, knowledge about the frequency of the amplitude modulation can be used to determine the restoring force constant K of the standing wave field at the node position, as discussed in U.S. Pat. No. 4,773,266 by Barmatz et al. The amplitude of the amplitude modulation indicates the amplitude of object translation. For an object in rotation, the frequency of the amplitude modulation indicates the frequency of rotation, while the amplitude of modulation indicates the degree of nonsymmetry of the object about its axis or rotation. For an object in drop shape oscillation, the frequency of amplitude modulation indicates the frequency of shape oscillation, while the amplitude of modulation indicates the degree of change from a spherical shape. Simple qualitative changes in the amplitude modulation, such as a single change in amplitude, as opposed to oscillations in amplitude, can indicate critical events such as loss of acoustic positioning of the object and phase changes of the material of the object due to heating or cooling.

Where it is desired to avoid oscillation of the object, techniques for damping oscillation such as reducing the frequency output of the transducer to slightly less than resonance as described in U.S. Pat. No. 4,773,266, can be resorted to when the amplitude of oscillations exceeds a certain threshold level. FIG. 1 illustrates a threshold detection circuit 66 which, when it detects an amplitude modulation above a certain level, slightly reduces the frequency output of the circuit 20 to below a resonant frequency to damp oscillations. Where it is desired to avoid excessive rotation (e.g. to avoid explosive splattering of liquid), techniques for damping rotation can be used, such as adjusting the phase difference between degenerate positioning frequencies (where two identical frequencies are used in acoustic positioning). This technique, which is described in U.S. Pat. No. 4,800,756 by Barmatz et al, can be resorted to when the frequency that indicates rotation, has an amplitude modulation that exceeds a certain threshold value.

The present invention can be used to determine the surface tension and viscosity of an object. With the object positioned at or near a node of a standing wave pattern, the transducer output is amplitude modulated at a certain frequency. The amplitude modulation is suddenly stopped (but the sonic energy continues at a constant frequency and amplitude). The amplitude modulation of the field caused by the transducer decays very rapidly, but amplitude modulation caused by drop shape oscillation generally decays much more slowly and can be detected. Amplitude modulation of the field can again start and suddenly stop to detect the resulting object shape oscillation magnitude. This process can be continued over a band of modulation frequencies to determine that frequency which produces the maximum drop shape oscillation. That is one of the normal modes of oscillation of the drop. From that resonant frequency and the radius of the drop, one can calculate the surface tension of the drop material. Furthermore, by measuring the rate decay of amplitude modulation caused by drop shape oscillation near the resonant frequency of drop oscillation (e.g. FIG. 3) one can also calculate the viscosity of the drop material.

For the system of FIG. 1, the transducer may be energized in a single wave mode such as described in U.S. Pat. No. 4,573,356 by Barmatz et al, where a single frequency output of a single transducer positions the object in three dimensions (along directions X, Y and Z). It is also possible to use two or three separate frequencies, as where three frequencies are used that are each resonant to a different one of three chamber dimensions for the parallelopiped chamber of FIG. 1. Three separate transducers can be used, or the single transducer 18 can be energized at three frequencies.

In one example, resonant frequencies along three chamber dimensions Ly, Lz, and Lx are respectively 25 kHz, 20 kHz, and 15 kHz. The output of the microphone 24 can be passed in parallel through three passband filters 70, 72, 74 that each passes only a narrow band (e.g. 24.5 kHz to 25.5 kHz for filter 70) corresponding to one of the three resonant frequencies. Where the low pass filter 40 has a low cutoff frequency such as 1 kHz that is below all three resonant frequencies, the output of one passband filter at a time can be connected to the low pass filter 40, through a four position switch 76 (when switch 78 is open). If the object oscillates in translation along only one direction such as the X direction, the frequency resonant to the chamber length Lx will display the greatest amplitude modulation. If the object rotates about an axis extending in the Y direction, then frequencies resonant to the chamber lengths Lx and Lz will have the greatest amplitude modulation. By this technique, the direction of object translation and the axis of object rotation, as well as the amplitude of motion in the particular direction can be determined.

A number of bandpass filters can be used to form a spectrum analyzer that quickly indicates the frequencies of amplitude modulation and the magnitude at each frequency. A low pass filter may be considered to be a passband filter that passes a frequency between zero and a particular frequency above zero.

Thus, the invention provides a method and apparatus for obtaining information about movement of an object, in a noninvasive and simple manner. The sonic energy in the acoustic standing wave field is monitored, and amplitude modulation of the sonic energy is obtained, which indicates motion of the object. Apparatus for obtaining the amplitude modulation can include a microphone coupled to the inside of the chamber to detect sonic energy therein and a band pass, or low pass, filter which blocks the frequency of the output of the transducer that generates the sonic energy, to pass only lower frequencies which indicate amplitude modulation.

Although particular embodiments of the invention have been described and illustrated herein, it is recognized that modifications and variations may readily occur to those skilled in the art, and consequently it is intended that the claims be interpreted to cover such modifications and equivalents.

We claim:

1. A method for determining a frequency of motion of an object that is acoustically positioned in a chamber by an acoustic standing wave field in the chamber, comprising:
    sensing amplitude modulation of said acoustic standing wave field in said chamber, determining one frequency component of said amplitude modulation which is of a frequency less than the frequency of acoustic energy of said standing wave field, and indicating a frequency of object motion to be the frequency of said one frequency component of said amplitude modulation.

2. The method described in claim 1 including:
    coupling a transducer to said chamber;
    applying electrical energy from an oscillator to said transducer;
    coupling a microphone to said chamber, connecting the output of said microphone to said oscillator, and varying the frequency output of said oscillator to a frequency at which the amplitude of said acoustic standing wave field is close to a maximum;
    said step of sensing variations including coupling the output of said microphone to a filter that passes only frequencies below the frequency of energy supplied by said oscillator to said transducer.

3. The method described in claim 1 including:
    establishing a plurality of acoustic standing wave fields in said chamber, each field being resonant to a different dimension of said chamber, and each field having a different frequency;
    said step of sensing variations including sensing variations in amplitude of each of said fields, whereby to indicate object motion in each of a plurality of directions.

* * * * *